July 20, 1926.

D. C. PRINCE

ELECTRIC SYSTEM

Filed August 26, 1925

1,593,357

2 Sheets-Sheet 1

Inventor:
David C. Prince,
by
His Attorney.

July 20, 1926.

D. C. PRINCE

ELECTRIC SYSTEM

Filed August 26, 1925   2 Sheets—Sheet 2

1,593,357

Inventor:
David C. Prince,
by
His Attorney.

Patented July 20, 1926.

1,593,357

UNITED STATES PATENT OFFICE.

DAVID C. PRINCE, OF SCHENECTADY, NEW YORK, ASSIGNOR TO GENERAL ELECTRIC COMPANY, A CORPORATION OF NEW YORK.

ELECTRIC SYSTEM.

Application filed August 26, 1925. Serial No. 52,679.

My invention relates to electric systems wherein current is interchanged between circuits operating at different voltages, and has for its principal object the provision of an improved apparatus for effecting the transfer of current between direct current circuits operated at different voltages.

It is well known that the efficient transmission of electric energy over long distances involves the utilization of high voltage transmitting circuits, that direct current systems possess the advantage of low reactive losses, and that alternating current systems have been utilized heretofore largely because the apparatus available for transforming alternating current from one voltage to another has been simpler and more efficient than that available for transforming direct current from one voltage to another. In a co-pending application for Letters Patent of the United States, Serial No. 651,410, filed July 13, 1923, I have disclosed an apparatus comprising electron discharge devices connected to the primary and secondary circuits of an alternating current transformer for derectifying current at one voltage and rectifying it at another voltage, the operation of the de-rectifying discharge devices being controlled by means of control electrodes or grids interconnected with the circuit to which rectified current is supplied. My present invention is in some respects an improvement on that disclosed by the aforesaid application and differs therefrom both in the construction of the electron discharge apparatus and in the manner of its control.

My invention will be better understood from the following description when considered in connection with the accompanying drawings and its scope will be pointed out in the appended claims.

Figure 1:
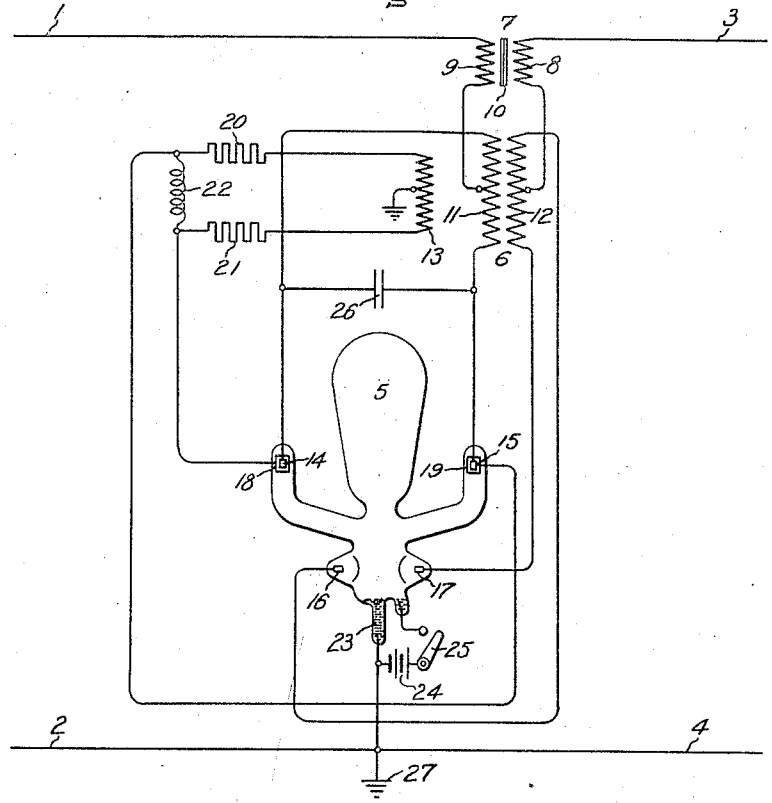
Figure 2:
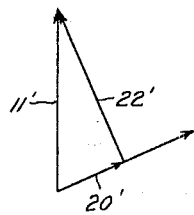
Figure 4:
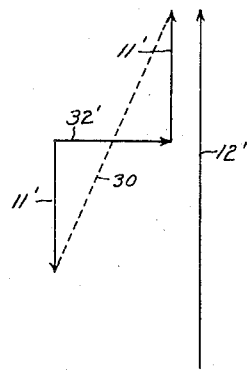
Figure 3:
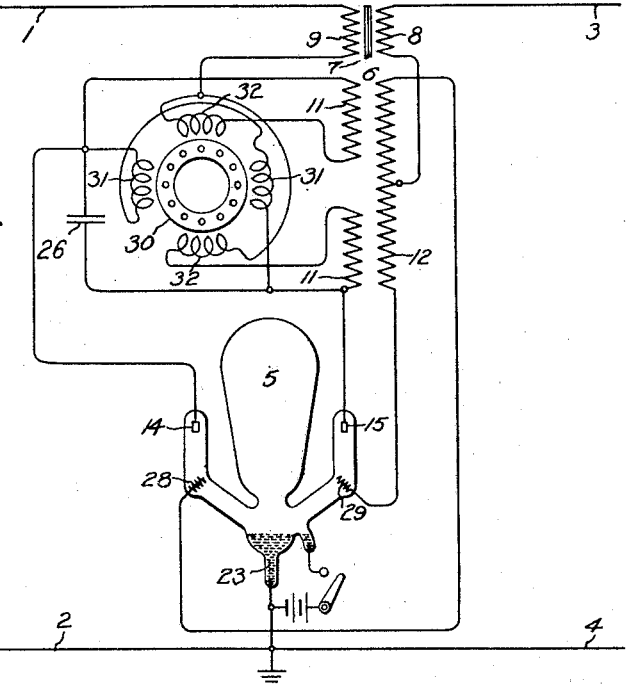
Figure 5:
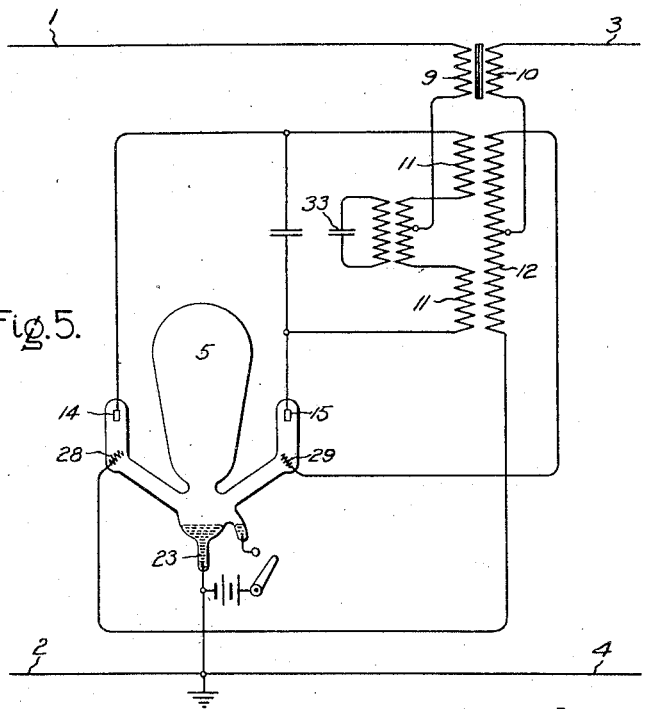

Referring to the drawings, Fig. 1 shows a system comprising an electric valve device adapted simultaneously to derectify and rectify the current transmitted between direct current circuits operating at different voltage; Fig. 2 is a vector diagram illustrating certain details in the operation of the device; Figs. 3 and 4 relate to an embodiment of the invention wherein the same electrodes are utilized to control the operation of the derectifier and to transmit the rectified current; and Fig. 5 shows a further modification in the means for controlling the grid potential of the apparatus; and Figs. 6 and 7 relate to a modification in the grid potential control apparatus of Fig. 1.

Fig. 1 shows direct current circuits 1—2 and 3—4 arranged to be operated at different voltages and interconnected through an electric valve apparatus 5, a transformer 6 and a reactance device or harmonic transformer 7 which comprises coils 8 and 9 wound on a core 10. The transformer 6 comprises a primary winding 11, a secondary winding 12 and a tertiary winding 13, the terminals of the primary winding 11 being connected to derectifying anodes 14 and 15 of the valve 5, the terminals of the secondary winding 12 being connected to rectifying anodes 16 and 17 of valve 5 and the terminals of the tertiary winding 13 being connected to the grids or control electrodes 18 and 19 of valve 5 through resistors 20 and 21 and reactor 22 which are provided for advancing the phase of the grid voltage with respect to that of the voltage applied to anodes 14 and 15.

The valve 5 comprises a mercury cathode 23 and is provided with the usual source of current 24 and switch 25 for initiating its operation. The frequency at which current oscillates in the primary circuit of transformer 6 is determined by a condenser 26 connected across this circuit. The direct current conductor 1 is connected through coil 9 to the winding 11 at a point intermediate its ends. The conductor 3 is likewise connected through coils 8 to the winding 12 and the conductors 2 and 4, shown as grounded at 27, are connected to the cathode 23.

With these connections, current is transmitted between conductors 1 and 2 through anodes 14 and 15 successively during periods of time dependent on the free vibration period of the circuit formed by condenser 26 and winding 11, a current is induced in the secondary circuit 12 due to oscillation of the current in primary winding 11, and this current induced in the secondary winding 12 is rectified by means of anodes 16 and 17 and cathode 23 in a well known manner and is supplied to the direct current circuit 3—4 through coil 8 of the harmonic transformer 7.

The harmonic transformer 7 operates to stabilize the voltage of the direct current circuit 3—4 both when the voltage of primary coil 11 is zero and when it has its maximum value. When the voltage of coil 11 is passing through zero, no voltage is impressed on the secondary circuit, and no counter electromotive force exists between the terminals of the primary circuit. Under these conditions, the current of the circuit 3—4 tends to decrease and that of the circuit 1—2 tends to increase but these tendencies are caused to counteract one another due to the inductive link formed by the harmonic transformer 7 and objectional fluctuations in the voltage of the circuit 3—4 are prevented. Likewise when the primary and secondary voltages of transformer 6 are passing through their maximum values the harmonic transformer operates to absorb enough of the secondary voltage to prevent objectionable fluctuations in the value of the load circuit voltage. The harmonic transformer 7 is of course designed to have the same ratio of transformation as the main transformer 6 and is so wound that the direct current component fluxes in the coils 8 and 9 cancel one another.

In the operation of a system of the type described, it is desirable that the transmission of current through one of the anodes 14 or 15 be initiated before the other anode ceases to transmit current, and that the transfer of current from one electrode to another should be effected before the potentials of the anodes attain the same value. In order to produce this result, it is necessary that the voltages applied to control anodes 18 and 19 lead the voltages applied to the anodes 14 and 15. This phase relation between the grid and anode voltages may be produced by various means.

Fig. 2 shows vector 11′ which represents the voltage of the tertiary winding 13, vector 20′ which represents the voltage drop produced by resistors 20 and 21, and vector 22′ which represents the voltage produced across the reactor 22 and applied to the grids 18 and 19. Assuming counter clockwise rotation, it will be observed that the vector 22′ leads the vector 11′, thus ensuring the production of the grid and anode voltage relation required for satisfactory and efficient operation of the derectifying element of the device 5.

Figure 6:
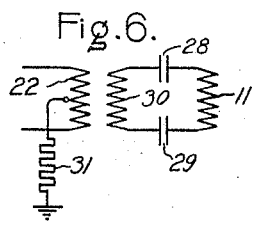
Figure 7:
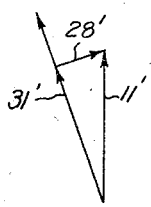

Fig. 6 shows a modification in the grid potential control apparatus of Fig. 1. This apparatus comprises a coil 22 connected to ground or to the cathode 23 through a resistor 31 and inductively related to a coil 30 which is connected to the secondary winding 11 through condensers 28 and 29. With these connections, a leading voltage, represented by the vector 31′ of Fig. 7, is applied to the grids 18 and 19.

Fig. 3 shows a modification of the invention wherein the grids 18 and 19 and anodes 16 and 17 are replaced by a single pair of anodes 28 and 29 which function both to control the transmission of current through the inverter or derectifying element of the device and to rectify the current supplied through the secondary winding 12 to the direct current circuit 3—4. In this modification, a freely rotating machine comprising a squirrel cage rotor 30, a pair of stator windings 31 connected to the terminals of the primary circuit 11, and a pair of stator windings 32 wound in quadrature with the winding 31 and interposed between the two halves of the primary circuit are provided for controlling the phase relation between the voltages applied to anodes 14 and 15 and those applied to electrodes 28 and 29.

Fig. 4 shows a vector diagram wherein the primary voltage is represented by vectors 11′, the voltages produced by the freely rotating machine are represented by the vector 32′, the voltage applied to anodes 14 and 15 is represented by vector 30 and the voltage induced in the secondary circuit is represented by the vector 12′. It will be observed that the voltage applied to electrodes 28 and 29 leads that applied to anodes 14 and 15, thus establishing the voltage relation previously described as necessary for proper operation of the derectifying element of the device 5.

Fig. 5 shows a further modification wherein the freely rotating machine of Fig. 3 is replaced by a condenser 33 through which a quadrature component is injected into the voltage applied to the anodes 14 and 15.

It should be noted that, in the operation of the modifications illustrated by Figs. 3 and 5, the phase angle by which the anode voltage leads the voltage applied to the electrodes 28 and 29 is dependent on the magnitude of the current transmitted between the direct current circuits for the reason that the freely rotating machine of Fig. 3 and the condenser of Fig. 5 are connected in series relation with the primary circuit of the main transformer 6. With these connections, the angle of lead increases with the load. This is very advantageous because the inductive lag of the circuits and the ionization of the device 5 are increased by an increase in the magnitude of the current and a longer time is required to produce deionization and effect the transfer of current from one of the anodes to the other. It will also be observed that one starting of the arc initiates operation of both the inverter or derectifier element and the rectifier element of device 5. This has the advantage that it simplifies the problem of controlling and operating the apparatus.

The embodiments of the invention illustrated and described have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:—

1. The combination of a plurality of direct current circuits adapted to be operated at different voltages, a transformer comprising a primary winding connected to one of said circuits and a secondary winding connected to another of said circuits, and an electric valve device comprising an anode connected to said primary winding, an electrode connected to said secondary winding and a cathode connected to said circuits.

2. The combination of a plurality of direct current circuits adapted to be operated at different voltages, a transformer comprising a primary winding connected to one of said circuits and a secondary winding connected to another of said circuits, and an electric valve device comprising an anode connected to said primary winding, an electrode connected to said secondary winding, a cathode connected to said circuits, and means for producing between the voltages of said anode and electrode a phase displacement dependent on the current of said primary winding.

3. The combination of a plurality of direct current circuits adapted to be operated at different voltages, a transformer comprising a primary winding connected at a point intermediate its terminals to one of said circuits and a secondary winding likewise connected to another of said circuits, an electric valve device comprising a cathode connected to said circuits, a pair of anodes connected to said primary winding and a pair of anodes connected to said secondary winding, and means for producing a phase displacement between the voltages applied to said pairs of anodes.

4. The combination in a system of electrical distribution of a source of direct current, an asymmetric conducting device having a cathode and two anodes located at different distances from said cathode, a connection from said source of direct current to one of said anodes through the primary winding of a transformer and a secondary winding for said transformer which is connected to the second anode of said device and to a load circuit.

5. The combination in a system of electrical distribution of a source of direct current, an asymmetric conducting device having a cathode and two sets of anodes located at different distances from said cathode, a connection from said source of direct current through the primary windings of a transformer to one set of said anodes, and secondary windings for said transformer which are connected to the second set of anodes of said device and to a load circuit.

6. The combination in a system of electrical distribution of a source of direct current, an asymmetric conducting device having a cathode and two anodes located at different distances from said cathode, a connection from said source of direct current to one of said anodes through a reactance and the primary winding of a transformer and a secondary winding for said transformer which is connected to the second anode of said device and to a load circuit through a reactance which is inductively related to the first mentioned reactance.

7. The combination in a system of electrical distribution of a source of direct current, an asymmetric conducting device having a cathode and two sets of anodes located at different distances from said cathode, a connection from said source of direct current through a reactance and the primary winding of a transformer to one set of said anodes and secondary windings for said transformer which are connected to the second set of anodes of said device and to a load circuit through a reactance which is inductively related to the first mentioned reactance.

8. The combination in a system of electrical distribution of an asymmetric conducting device having a cathode and two anodes located at different distances from said cathode and circuit connections to said electrodes whereby the anode nearest the cathode serves to control the flow of current to the other anode and to supply direct current to a load circuit.

9. The combination in a system of electrical distribution of an asymmetric conducting device having a cathode and two sets of anodes located at different distances from said cathode and circuit connections to said electrodes whereby the set of anodes nearest the cathode serve to control the flow of current to the other set of anodes and to supply direct current to a load circuit.

10. The combination in a system of electrical distribution of a source of direct current, an asymmetric conducting device having a cathode and two anodes, a connection from said source of direct current to one of said anodes through a primary winding, a secondary winding inductively related to said primary winding, means for impressing upon the second of said anodes a potential derived from said secondary winding for controlling the current flow to the first anode to supply current impulses to said primary winding at predetermined intervals and a load circuit connected to the second anode and the secondary winding.

11. The combination in a system of electrical distribution of a source of direct current, an asymmetric conducting device having a cathode and two sets of anodes, a connection from said source of direct current to one set of said anodes through a primary winding, a secondary winding inductively related to said primary winding, means for impressing upon the second set of said anodes a potential derived from said secondary winding for controlling the current flow to the first set of anodes to supply current impulses to said primary winding at predetermined intervals, and a load circuit connected to the second set of anodes and the secondary winding.

12. The combination in a system of electrical distribution of a source of direct current, an asymmetric conducting device having a cathode and two anodes, a connection from said source of direct current to one of said anodes through a primary winding and a reactance, a secondary winding inductively related to said primary winding, means for impressing upon the other of said anodes a potential derived from said secondary winding for controlling the current flow to the first anode to supply current impulses to said primary winding at predetermined intervals and a load circuit connected to the second anode and the secondary winding through a reactance which is inductively related to the first mentioned reactance.

13. The combination in a system of electrical distribution of a source of direct current, an asymmetric conducting device having a cathode and two sets of anodes, a connection from said source of direct current to one set of anodes through a primary winding and a reactance, a secondary winding inductively related to said primary winding, means for impressing upon the second set of anodes a potential derived from said secondary winding for controlling the current flow to the first set of anodes to supply current impulses to said primary winding at predetermined intervals and a load circuit connected to the second set of anodes and the secondary winding through a reactance which is inductively related to the first mentioned reactance.

In witness whereof, I have hereunto set my hand this 14th day of August 1925.

DAVID C. PRINCE.